United States Patent [19]

Cornelius et al.

[11] Patent Number: 4,856,605
[45] Date of Patent: Aug. 15, 1989

[54] NONSYSTEM-CONNECTED ELECTRONIC BALANCE

[75] Inventors: Klaus Cornelius, Lenglern; Rainer Exner, Wollbrandshausen, both of Fed. Rep. of Germany

[73] Assignee: Sartorius GmbH, Fed. Rep. of Germany

[21] Appl. No.: 249,826

[22] Filed: Sep. 27, 1988

[30] Foreign Application Priority Data

Nov. 30, 1987 [DE] Fed. Rep. of Germany ..... 68715820

[51] Int. Cl.$^4$ .............................................. G01G 3/14
[52] U.S. Cl. .......................... 177/210 R; 177/DIG. 3
[58] Field of Search ............................ 177/178, 210 R

[56] References Cited

U.S. PATENT DOCUMENTS 4,244,020  1/1981  Ratcliff ..................... 177/25.16 X
4,696,359  9/1987  Glibbery ........................ 177/211

Primary Examiner—George H. Miller, Jr.
Attorney, Agent, or Firm—Eric P. Schellin

[57] ABSTRACT

Solar cells (5) for the supply of electric energy are located in an electronic balance in a manner suitable for the requirements of the balance and storage means for storing the electric current generated by the solar cells (5) are present. The solar cells (5) are located, for example, in a folding cover (7) which protects the balance when it is not in use and which is folded up at the start of operation. In addition, a display (9) for the state of charge of the storage means (76) is present.

10 Claims, 3 Drawing Sheets

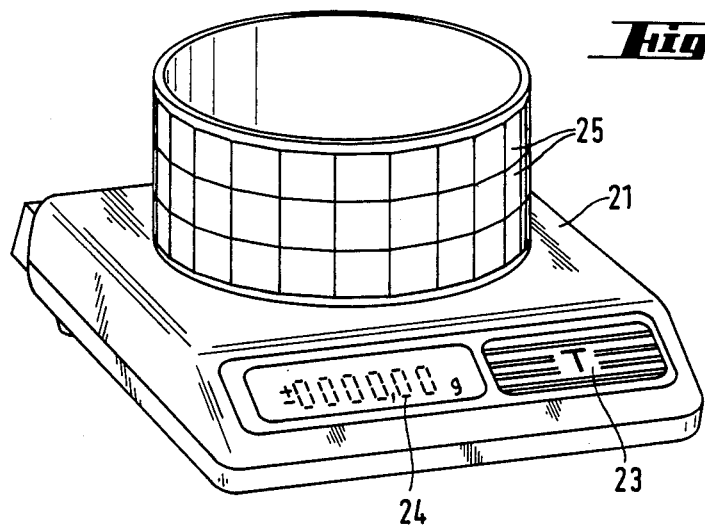
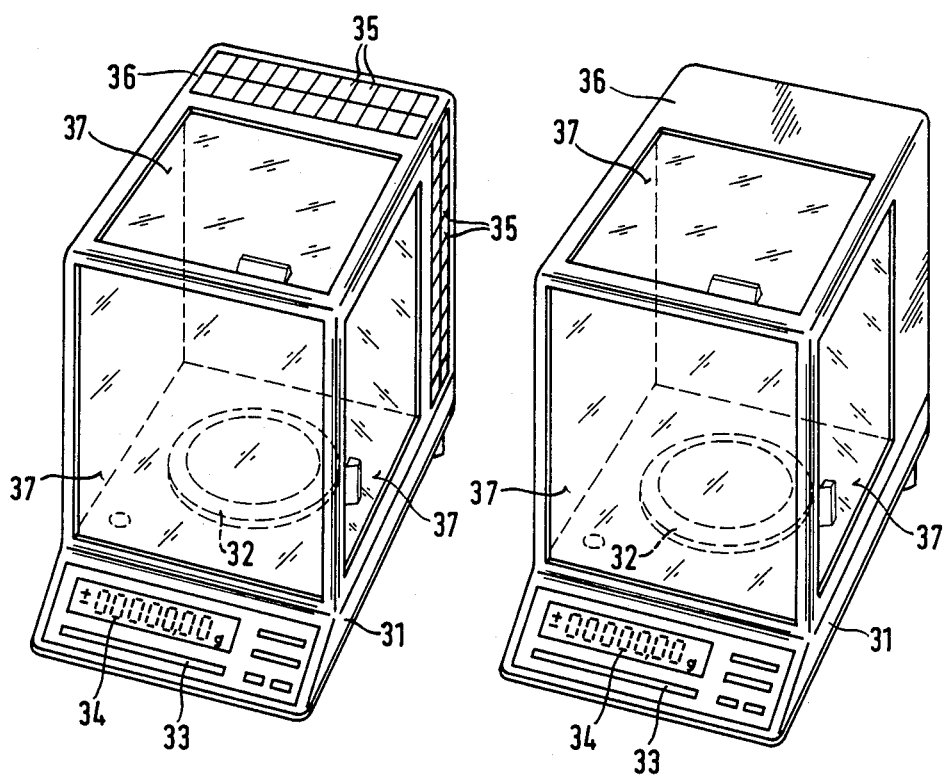

NONSYSTEM-CONNECTED ELECTRONIC BALANCE

The invention relates to an electronic balance. Balances of this type are generally known. The concept "electronic balance" is intended to refer to all balances whose operation require an electric current source, also, therefore, e.g. to such balances in which a scale is illuminated by a built-in light and is projected onto a ground-glass screen.

DESCRIPTION OF THE PRIOR ART

Various prior art electronic balances, and the like, as well as apparatus and method of their construction in general, are found to be known, and exemplary of the prior art are the following:

4,696,359: Glibbery

Joachim Benemann: Einsatzmoeglichkeiten Photovoltaischer Stromversorgungen, Siemens Energie & Automation, 7, no 6, pages, 415–418, 1985.

Solarzellen: Steckdose zum Mitnehmen, HighTech, no 4, pages 66 and 68, 1988.

Glibbery discloses an electronic weighing apparatus using a low level power supply and the use of a rechargable capacitor pack of perhaps three series connected capacitors that require no threshold level; the capacitor pack is a permanent component having a characteristic essentially like an electrolytic capacitor except they are nonpolarized and exhibit up to a certain level of charge characteristics very similar to aluminum electrolytic capacitors and exhibit a rather large amount of dielectric absorption.

These patents or known prior uses teach and disclose various types of electronic balances of sorts and of various manufactures and the like as well as methods of their construction, but none of them whether taken singly or in combination disclose the specific details of the combination of the invention in such a way as to bear upon the claims of the present invention.

A disadvantage of the customary electronic balances is the fact that they require a main connection for the current supply of the electronic components which main connection can cause problems in some applications. It is known that batteries can be built into the balance so that it can function without a main connection. However, this considerably increases the weight of the balance and the frequent replacing of batteries and their recharging is bothersome.

The present invention therefore has the result of creating an electronic balance which is nonsystem-connected and which functions without batteries.

The invention solves this problem in that solar cells for supplying electric energy are attached to the balance in a manner appropriate for the requirements of the balance and that storage means are present for storing the electric current generated by the solar cells.

In order to accommodate the required solar-cell area on an electronic balance, which is certainly distinctly greater than it is e.g. in solar pocket calculators, there are various advantageous solutions which must be achieved.

BRIEF DESCRIPTION OF THE DRAWINGS

The invention is described in the following with reference made to the schematic figures.

FIG. 3 shows a third embodiment of the balance.
FIG. 4 shows a fourth embodiment of the balance.
FIG. 5 shows a fifth embodiment of the balance.

DETAILED DESCRIPTION OF THE INVENTION

Figure 1:
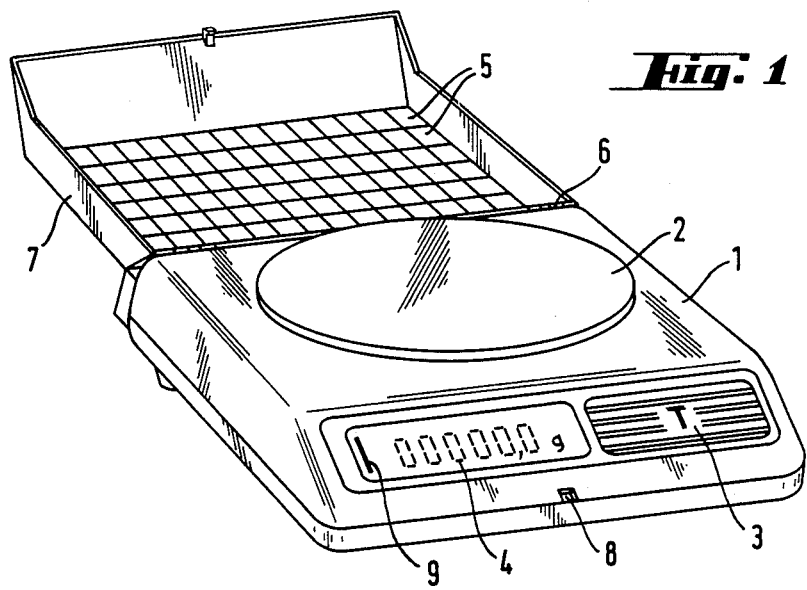
FIG. 1 shows a first embodiment of the balance.

The electric balance in FIG. 1 consists of a housing 1, a balance scale 2, a tare key 3 and a display 4 for the result of measuring. Furthermore, a cover 7 is present which is pivotably connected to the upper part of housing 1 via a hinge 6. The solar cells 5 are located on the inside of cover 7 and the electric connection to the electronic components of the balance runs in a covered manner in the area of hinge 6. The solar cells generate the electric current required for the operation of the balance in the open position of the cover shown. When the balance is not in use, cover 7 can be folded to the front and protects both the balance scale and the display as well as the solar cells from mechanical damage. Cover 7 snaps into a lock 8 on the balance housing. Naturally, a carrying handle can also be provided. FIG. 1 also shows a monitoring display in the form of a beam 9 whose length is proportional to the state of charge of the storage element (76 in FIG. 9). Thus, the user can always see whether the solar cells are supplying sufficient current.

Figure 2:
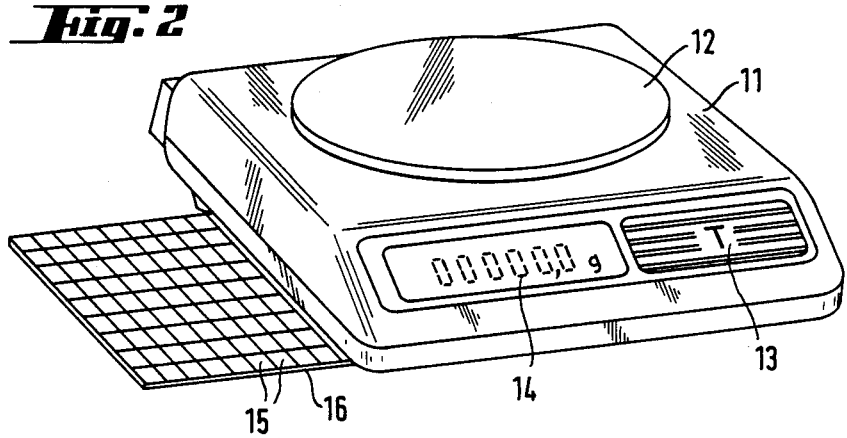
FIG. 2 shows a second embodiment of the balance.

The embodiment of the balance shown in FIG. 2 carries solar cells 15 on a plate 16 which can be pulled out laterally from beneath housing 11. A corresponding plate with solar cells can also be pulled out on the opposite side of housing 11 and optionally also on the front side. Balance scale 12, display 14 and tare key 13 are again designed in a customary manner.

The design shown in FIG. 3 again comprises a housing 21, a balance scale (not recognizable), a display 24 and a tare 23. The solar cells 24 are arranged here in the form of an approximately cylindrical windscreen. Thus, this design fulfills both the function of a "windscreen" as well as the function of "energy supply". Since the solar cells face in all directions, the generation of current of this arrangement is largely independent of the incident direction of the light.

The embodiment shown in FIG. 4 comprises a closed weighing area around balance scale 32 which area is formed by lower part 31 and prismoid superstructure 36 with movable panes 37. Solar cells 35 are fastened to the stationary part 36 of the superstructure only on the top or also on the two side surfaces, as required. Display 34 and tare key 33 are again designed in a customary manner.

A similar embodiment is shown in FIG. 5. It differs from the embodiment shown in FIG. 4 only in that the solar cells are applied here as an "invisible" layer onto transparent panes 37. This lowers the light permeability of panes 37 and they appear to be tinted. The layer of solar cells can either be adhered as a foil of panes 37 or it can be deposited on them by well known evaporation techniques. This embodiment has the advantage that the layer of solar cells not only generates electricity but also partially screens the weighing area against the ambient radiation.

Figure 6:
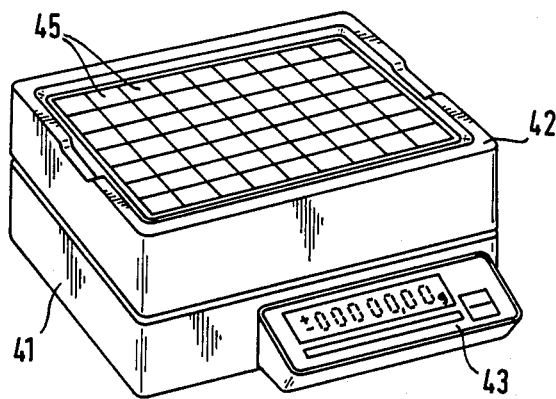
FIG. 6 shows a sixth embodiment of the balance.

The embodiment shown in FIG. 6 comprises a balance scale 42 which entirely covers the upper part of housing 41. Only the display and operating element 43 still projects to the front. Solar cells 45 are located on balance scale 42 in this embodiment. The partial or total shading of the solar cells when material to be weighed is placed on the scale generally causes no problems since storage means are provided in the electronic circuitry of the balance for the current generated by the solar cells which means bridges the interruptions.

Figure 7:
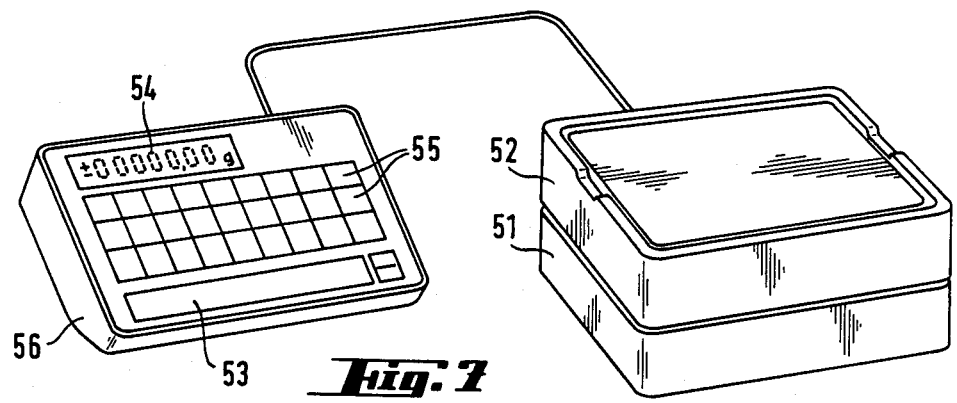
FIG. 7 shows a seventh embodiment of the balance.

In the embodiment shown in FIG. 7, the balance is divided into a weighing cell 51/52 and a separate unit 56 for the display 54 and the tare key 53. In this embodiment solar cells 55 are located on the front of display and operating unit 56.

Figure 8:
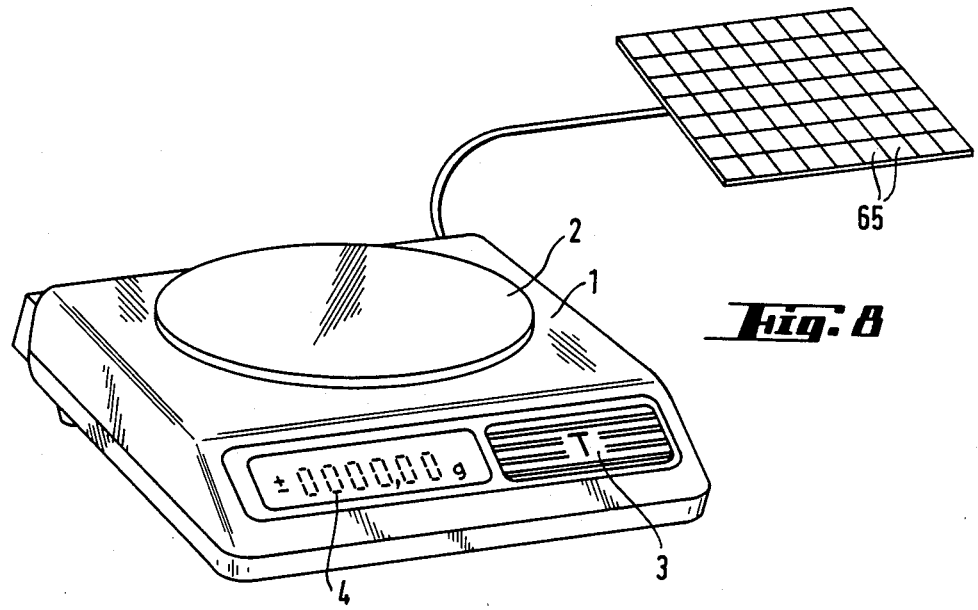
FIG. 8 shows an eighth embodiment of the balance.

In the embodiment shown in FIG. 8, solar cells 65 are designed as a separate plate which is connected to the rest of the balance only by a cable. As a result, the solar cells can be placed at a position with strong illumination and also optionally pivoted in a favorable direction.

Figure 9:
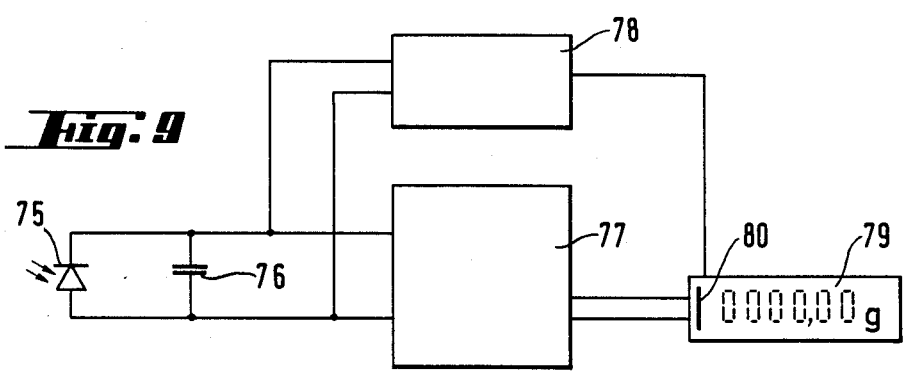
FIG. 9 shows a block wiring diagram of the electric construction.

FIG. 9 shows a block wiring diagram of the electric design of the balance. Solar cells 75 impart their current directly to electronic circuitry 77 of the balance. If more current is generated than electronic circuitry 77 requires, this excess current is fed into storage element 76. Storage element 76 is sketched in the figure as a capacitor; however, any other storage element desired can also be used instead of the capacitor, e.g. a rechargeable battery. The state of charge of storage element 76 is monitored by check circuit 78 and displayed adjacent to weight display 79 e.g. by means of a beam 80 which varies in length. This display for the state of charge of the storage element is shown as beam 9 only in the first embodiment according to FIG. 1 but it can of course also be present in all of the other embodiments. In addition, the balance can comprise a charge regulator with electronic protection against running down and over discharging.

We claim:

1. Electronic balance comprising
   a balance scale (2, 12, 32) actuable in response to electric current from a power source and providing an electrical output,
   solar cells (5, 15, 25, 35, 45, 55, 65, 75) for generating electric current and coupled to the balance scale for supplying electronic energy in a manner suitable for the requirements of the balance,
   storage means (76) connected to the solar cells are provided for storing the electric current generated by the solar cells, and
   display means (9, 80) are provided for indicating a state of charge of storage of the storage means (76).

2. Electronic balance according to claim 1, characterized in that the solar cells (5) are located in a folding cover (7) which protects the balance when not in use and which is folded up at the start of operation.

3. Electronic balance according to claim 1, characterized in that the solar cells (15) are located on a plate (16) which can be pulled out from under the balance.

4. Electronic balance according to claim 1, characterized in that the solar cells (25) are arranged around the balance scale in such a manner that they form a windscreen for the balance scale at the same time.

5. Electronic balance according to claim 1 with a prismoid superstructure (36) behind the balance scale (32), characterized in that the solar cells (35) are located on this prismoid superstructure (36).

6. Electronic balance according to claim 1 with a weighing area surrounded by transparent panes (37), characterized in that the solar cells are located as a thin, transparent layer on the panes (37) of the limitation of the weighing area.

7. Electronic balance according to claim 1, characterized in that the solar cells (45) are located on the top of the balance scale (42).

8. Electronic balance according to claim 1 with a weighing cell (51/52) and with a separate display unit (56), characterized in that the solar cells (55) are located on the display unit (56).

9. Electronic balance according to claim 1, characterized in that the solar cells (65) are designed as a separate unit connected to the balance only by a cable.

10. Electronic balance according to claim 1, characterized in that the balance comprises a charge regulator with electronic protection against running down and over-discharging.

* * * * *